Sept. 6, 1966 G. WILLMS 3,270,903
LIGHTWEIGHT CONTAINER HANDLING
Filed Aug. 29, 1963 7 Sheets-Sheet 1
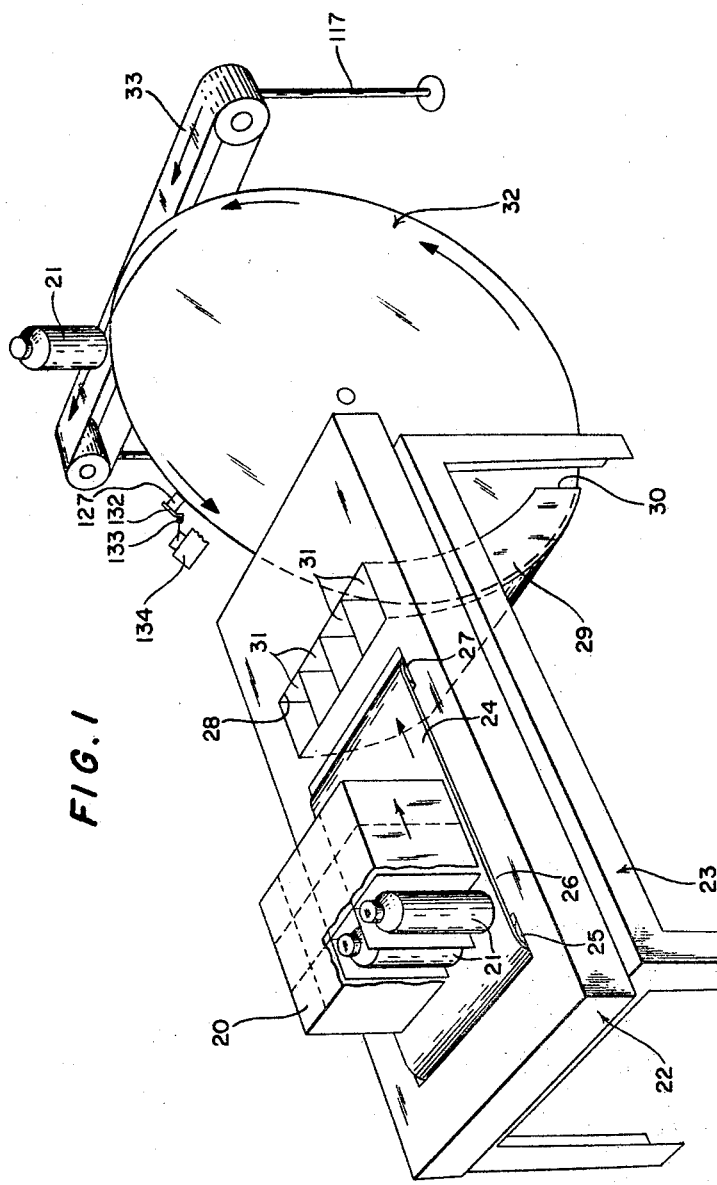
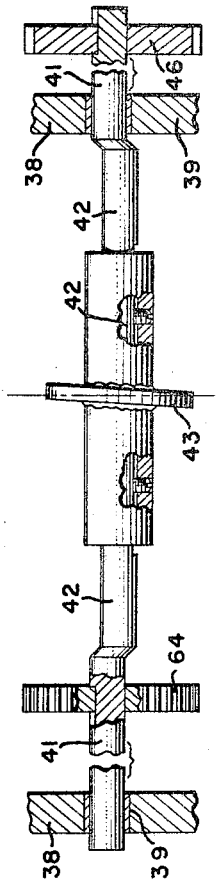
INVENTOR
GEORGE WILLMS
BY *Strauch, Nolan & Neale*
ATTORNEYS

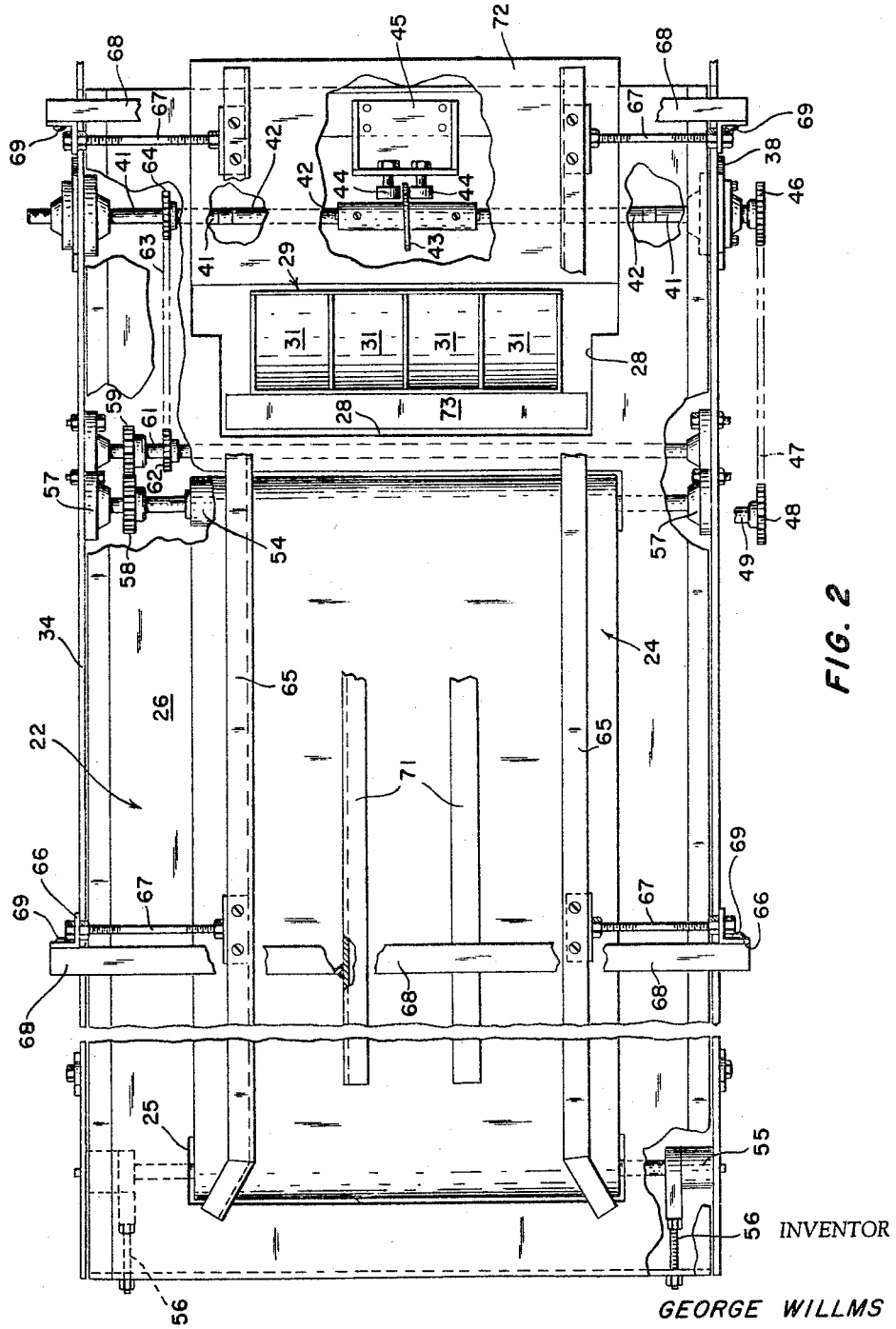

Sept. 6, 1966

G. WILLMS 3,270,903

LIGHTWEIGHT CONTAINER HANDLING

Filed Aug. 29, 1963

INVENTOR
GEORGE WILLMS

BY Strauch, Nolan & Neale

ATTORNEYS

Sept. 6, 1966 G. WILLMS 3,270,903
LIGHTWEIGHT CONTAINER HANDLING
Filed Aug. 29, 1963 7 Sheets-Sheet 4
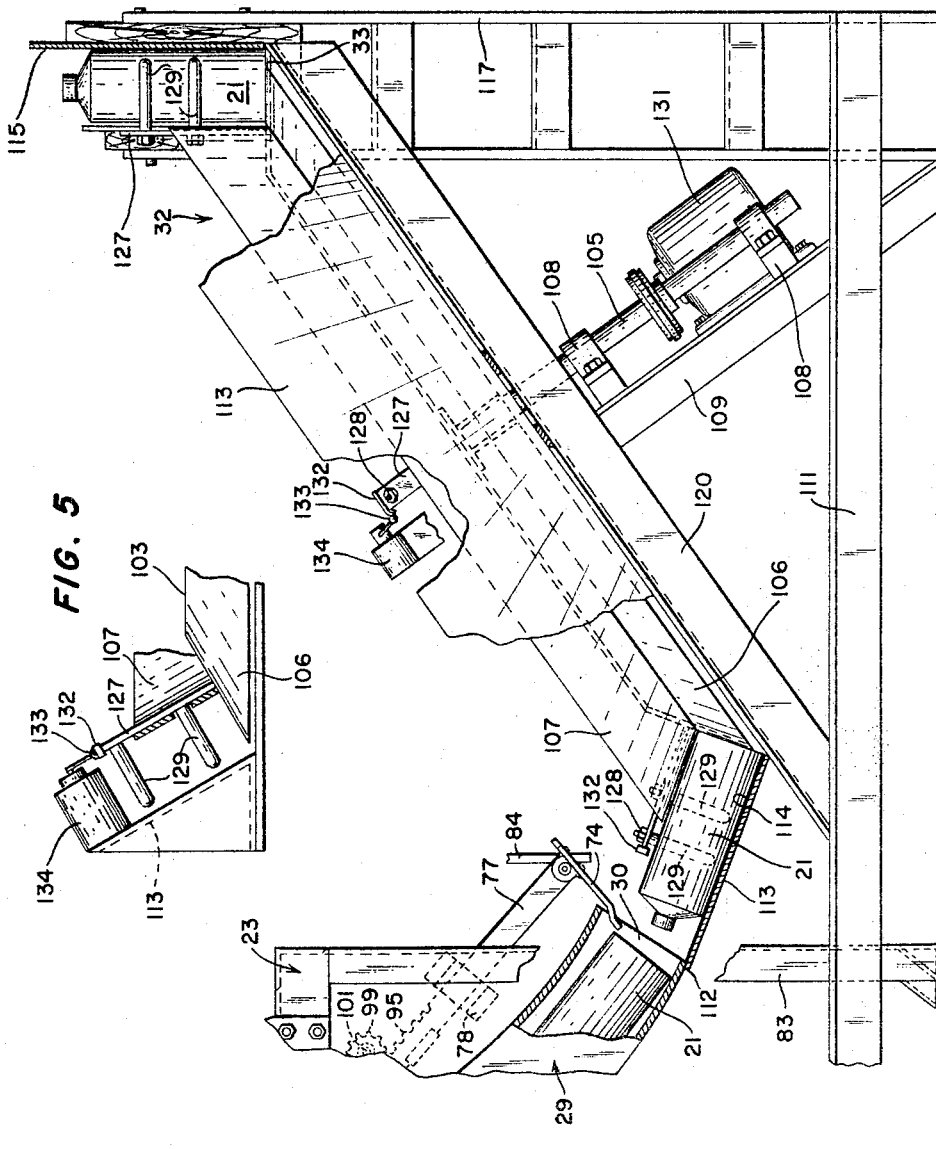
INVENTOR
GEORGE WILLMS
BY Strauch, Nolan & Neale
ATTORNEYS

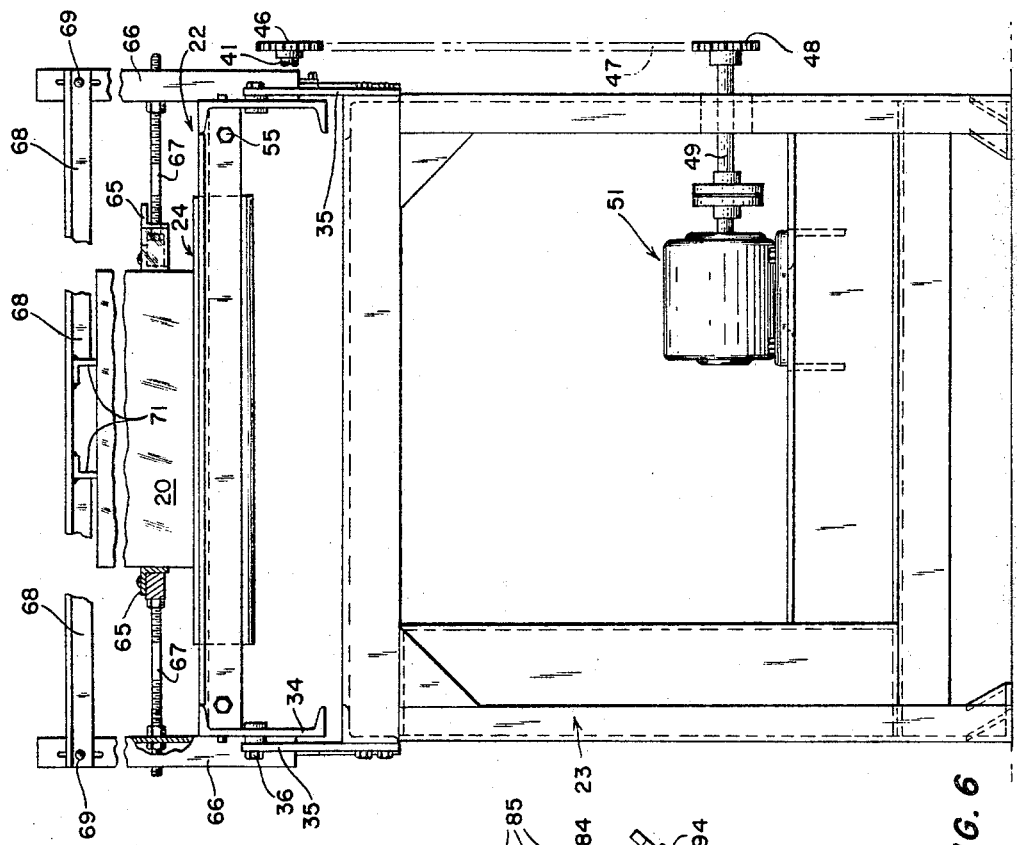

Sept. 6, 1966 G. WILLMS 3,270,903
LIGHTWEIGHT CONTAINER HANDLING
Filed Aug. 29, 1963 7 Sheets-Sheet 6

INVENTOR
GEORGE WILLMS

BY *Strauch, Nolan & Neale*
ATTORNEYS

Sept. 6, 1966 G. WILLMS 3,270,903
LIGHTWEIGHT CONTAINER HANDLING
Filed Aug. 29, 1963 7 Sheets-Sheet 7
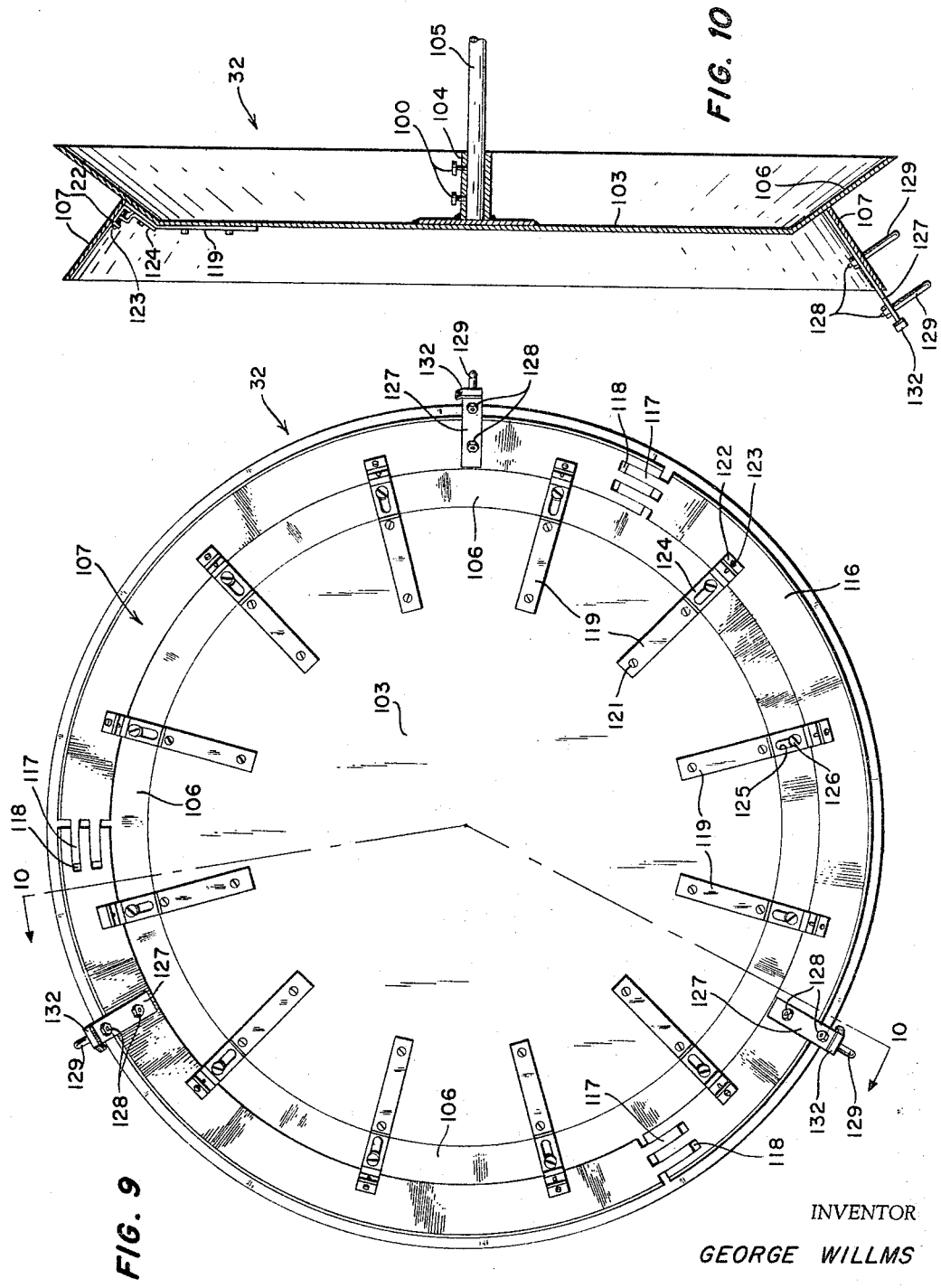
INVENTOR
GEORGE WILLMS
BY Strauch, Nolan & Neale
ATTORNEYS

United States Patent Office 3,270,903
Patented Sept. 6, 1966

3,270,903
LIGHTWEIGHT CONTAINER HANDLING
George Willms, Kansas City, Mo., assignor to Colgate-Palmolive Company, New York, N.Y., a corporation of Delaware
Filed Aug. 29, 1963, Ser. No. 305,340
17 Claims. (Cl. 214—308)

This invention relates to the handling of empty lightweight usually plastic containers, and is particularly concerned with apparatus for removing such containers from shipping or storage cartons and delivering the containers in an orderly manner to a filling station or the like.

Recently the use of lightweight blown or otherwise molded plastic bottles and like containers has increased tremendously. These containers are usually made by a vendor packed in cartoons and shipped empty to the factory where they are to be filled with product. In the cartons the individual containers are separated by a cellular construction to prevent damage. At the factory, the containers have to be removed from the cartoons. This presented no problem where the heavier glass or metal containers were concerned as they would tend to drop out by their own weight when the carton end was removed, but these very light plastic containers tend to be frictionally retained in their cells and some arrangement is needed for insuring their removal. The same lack of weight also makes them difficult to handle for introduction to automatic product filling machines, and the present invention is directed to special apparatus for extracting these lightweight containers and rearranging them for introduction into the automatic filling machine.

It is therefore the major object of this invention to provide novel apparatus for handling empty lightweight containers such as plastic bottles for removal from a storage or shipping carton to delivery to an automatic or other machine where the container is filled with a product.

A further object of the invention is to provide a novel apparatus for removing empty lightweight containers from a carton and rearranging them in order for delivery to a filling machine.

Another object of the invention is to provide a novel lightweight container handling apparatus wherein the containers are extracted from a carton on a vibratory platform and delivered to special conveying means.

It is a further object of the invention to provide a novel handling apparatus for lightweight containers wherein a group of such containers are delivered to a special conveyor such as a rotatable table that delivers them in order to another conveyor such as a moving belt. Pursuant to this object a special conveyor periodically operates controls that deliver to it successive groups of such containers.

Another object of the invention is to provide a novel apparatus for handling empty lightweight containers wherein groups of the containers are extracted from a carton and delivered by chutes to a rotary conveyor that moves them onto a linear conveyor for delivery to a product filling machine.

Pursuant to the foregoing objects the invention contemplates special associated conveyor operated controls for timed delivery of the container groups to the first conveyor as well as novel structural details which will be recited in the accompanying claims.

Further objects of the invention will appear as the description proceeds in connection with the appended claims and the annexed drawings wherein:

FIGURE 1 is a schematic view showing the apparatus of the invention;

FIGURE 2 is a top plan view partially broken away and in section showing the carton feeder platform and the upper end of the magazine;

FIGURE 3B is a fragmentary side elevation partly broken away and in section in substantial continuation of FIGURE 3A and showing the discharge end of the magazine and the rotary conveyor wheel;

FIGURE 4 is a fragmentary view partially in section showing the eccentric shaft cam arrangement for vibrating the platform;

FIGURE 5 is a fragmentary elevation partly in section showing the bottle control solenoid arrangement;

FIGURE 6 is an end elevation as viewed from the left end of FIGURE 3A;

FIGURE 7 is an enlarged fragmentary side elevation showing the bottle release and actuating mechanism;

FIGURE 9 is a top plan of the rotary conveyor wheel assembly; and

FIGURE 10 is a section along line 10—10 of FIGURE 9 showing details of the rotary conveyor wheel.

Figure 3A:
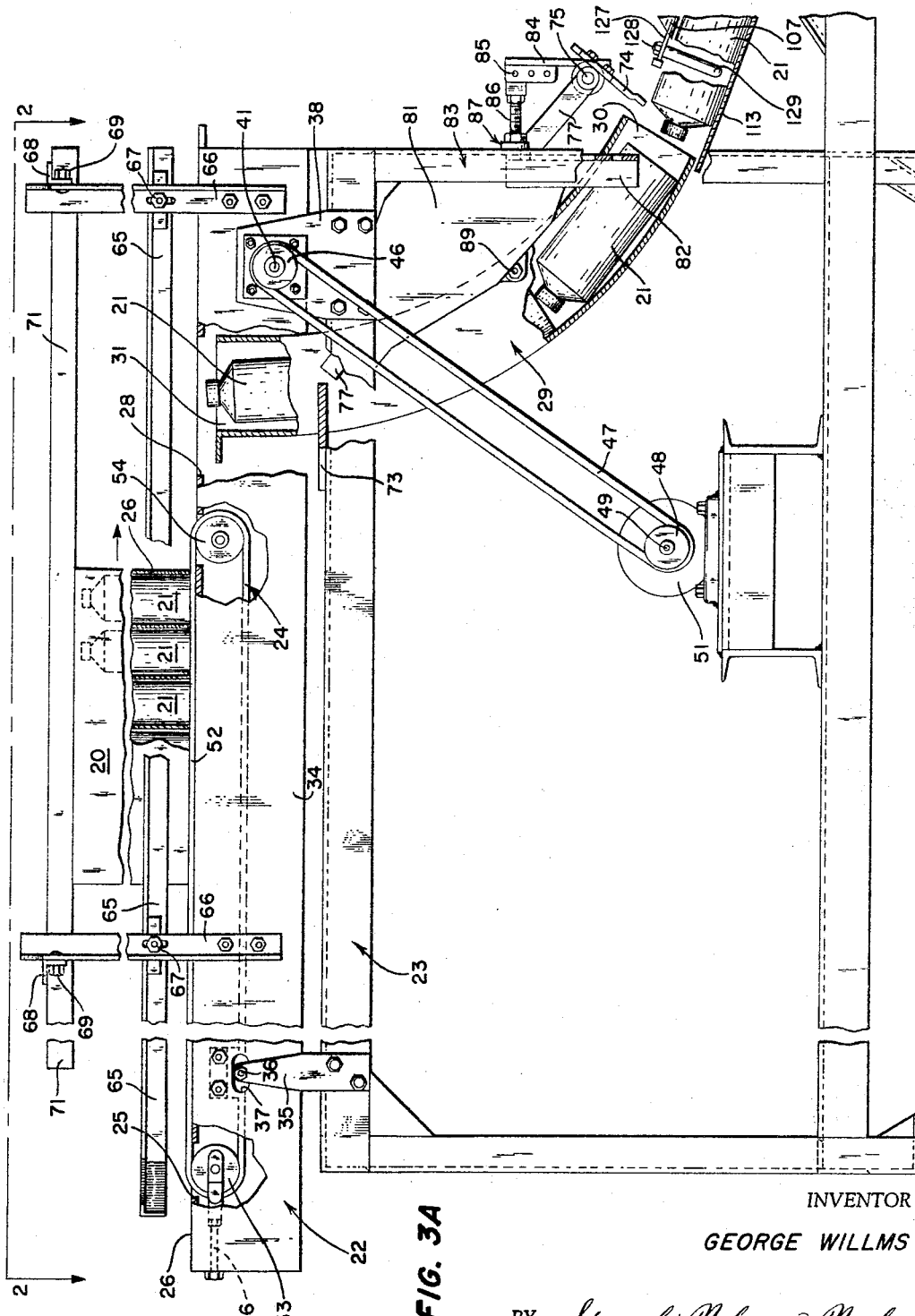
FIGURE 3A is a fragmentary side elevation partly broken away and in section showing the cartoon feeder platform and magazine arrangements.

Referring first to the schematic showing in FIGURE 1 a carton 20 containing rows of plastic bottles 21 separated by cell forming partitions has its bottom wall removed and is placed upon the horizontal feeder platform 22 which is mounted to be vibrated upon a stationary framework support 23 that rests on a floor. The bottles are now free to drop out of the carton onto the platform surface in upright position.

An attendant places opened carton 20 in its initial position on the left end of platform 22 and the carton is pushed along platform 22 to the right in FIGURE 1 until it overlies the upper flight of an endless belt 24 that emerges through opening 25, moves across that part of the horizontal platform surface 26 lying therebeneath and then moves down through opening 27.

In the present embodiment, the carton has transverse rows of four bottles each and the belt 24 is wide enough to underlie them all, with the transverse bottle rows extending at right angles to the direction of movement of the upper flight of the belt.

When the entire carton 20 is on the belt the lower cutaway wall edges of the carton and the bottom of all the bottles will rest on the upper flight of the conveyor belt and the carton will be carried to the right in FIGURE 1 at the speed of belt 24. As will appear platform 22 is vibrated to shake the bottles down onto it from the carton.

A rectangular opening 28 is provided across the horizontal platform surface at the right side of belt 24, and a downwardly and forwardly curved magazine structure 29 extends from opening 28 to a point well below the platform. Magazine 29 is divided transversely of the platform into a series of four separate chutes 31 of equal size from end to end in the magazine. These chutes decreasingly taper in size toward their lower discharge ends 30.

Chutes 31 are arranged in a transverse row at right angles to the movement of belt 24 and are so dimensioned and arranged as to receive simultaneously one transverse row of bottles at a time from the carton.

Thus, as each transverse row of bottles in the carton overlies opening 28, the bottles of that row will drop down the chutes 31. The length of magazine 29 from its entrance opening at 28 to its discharge opening at 30 is preferably equal to three or some other finite number of bottle lengths, so that for example the contents of a carton of three transverse rows of four bottles each may be received entirely within the magazine.

A rotary conveyor wheel 32 is disposed at the discharge end of the magazine to receive the bottles and transfer them upright to a linear belt conveyor 33 located at a higher level where they move in a single file in the direction of the arrow on belt 33 in FIGURE 1 toward a filling machine. In the preferred embodiment as will appear, the lowermost bottles are simultaneously discharged as a group at timed intervals from the magazine chutes onto conveyor wheel 32, and an important part of the invention comprises the controls for timed release of the bottles from the chutes.

FIGURES 2–9 illustrate details of a preferred structure and mode of carrying out the schematic arrangement of FIGURE 1.

Preferably platform 22 is a box-like sheet metal hollow structure 34 that is movably mounted on support 23. At the rear or delivery end shown at the left in FIGURE 3A, upright transversely aligned opposite brackets 35 on the support mount pins 36 extend into similar side wall slots 37 in the platform structure 34. This permits sliding pivotal movement of the platform.

At the forward end of the platform are transversely aligned opposite brackets 38 rigid with the support and formed with apertures containing aligned bushings 39 (FIGURE 4) journaling opposite ends of a shaft assembly 41 having an eccentric intermediate portion 42 mounting a cam disc 43. It will be noted that the surfaces of cam 43 are inclined with respect to the shaft axis. Cam 43 engages a suitable follower 44 on a bracket 45 rigidly depending from the upper wall of platform 22.

A sprocket 46 is fixed on the end of shaft 41 and connected by chain 47 to a sprocket 48 on the output shaft 49 of electric drive motor assembly 51. As shaft 41 is continuously rotated by the motor, eccentrically moving cam 43 coacts with follower 44 to cause platform 22 to cyclically oscillate both horizontally and vertically about its rear pivot at 36, thereby vibrating the entire platform sufficiently to jar loose any bottles that might tend to stick in the carton. While the above vibratory structure is satisfactory, it is within the scope of the invention to use any means for jarring or similarly vibrating the platform sufficiently to shake bottles 21 loose from their carton cells.

As shown in FIGURE 3A, the upper flight 52 of belt 24 is horizontal to underlie the open bottom of carton 20. Endless belt 24 is supported within platform structure 34 on rollers 53 and 54 rotatable upon parallel transverse axes. Rear roll 53 is an idler roll with its shaft supported on the platform sides in bearings 55 that have adjustable controls 56. Forward roll 54 has its opposite shaft ends journaled in platform mounted bearings 57, and rigid with the shaft of roller 54 is a gear 58 meshed with a gear 59 fixed on a transverse idler shaft 61. A sprocket 62 on shaft 61 is connected by chain 63 to a sprocket 64 fixed on a concentric end section of the shaft assembly 41. Thus rotation of shaft 41 continuously rotates pulley 54 which drives belt 24 by friction.

To guide carton 20 along the platform, parallel side rails 65 are provided, and rails 65 are supported on upright platform standards 66 by members 67 which are adjustable to vary the relative lateral position and spacing of rails 65. Traversing the front and rear pairs of standards 66 are cross members 68 mounted for vertical adjustment, as at 69. A pair of parallel top rails 71 are secured at opposite ends and extend longitudinally of platform 22.

In practice, side rails 65 and top rails 71 are adjusted to suit the dimensions of carton 20, and they insure that the carton does not deviate in moving along the platform; top rails 71 performing the useful function of preventing rearward tipping or sliding of the carton during vibration of the platform.

It will be noted that the front platform surface, indicated at 72 in FIGURE 2, may be a separate part from that forwardly of opening 28, but it is at the same horizontal level.

The upper end of magazine 29 is fixed to support 23, as by a bracket 73 (FIGURE 3A), so that magazine 29 is fixed with respect to vibratory platform 22.

Referring to FIGURES 3B, 5, 7 and 8 discharge of a bottle 21 from the lower end of each chute 31 is blocked by a stop finger 74, and there are four of these fingers 74 secured upon a rocker shaft 75 that has its opposite ends pivotally supported in bearings 76 at the lower ends of spaced parallel rack bars 77 which in turn are mounted to slide in bearing guides 78 on spaced parallel mounting plates 81 that are fixed by brackets 82 to front legs 83 of support 23.

To one side of fingers 74, rocker shaft 75 has secured thereto an arm 84 which may be pivotally connected through any of a plurality of pivot apertures 85 to the end of the piston rod 86 of an air cylinder motor 87 that has its casing pivoted on a bracket 88 at 89. Bracket 88 is fixed upon a transverse motor mount bar 91 that is secured as by bolts 92 upon the spaced rack bars 77.

Figure 8:
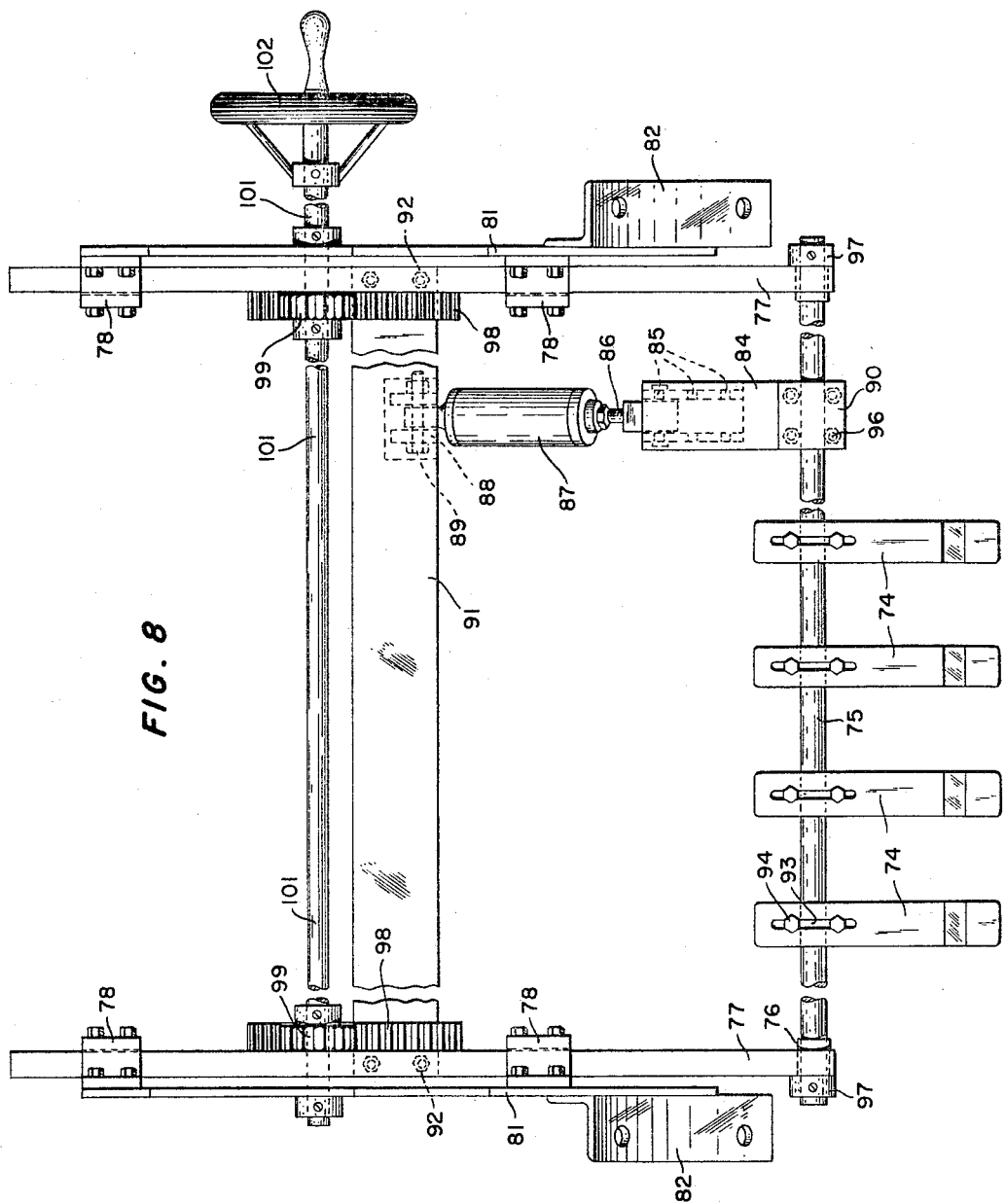
FIGURE 8 is a top plan view of the mechanism of FIGURE 7.

As shown in FIGURES 7 and 8, fingers 74 are mounted for pivotal and longitudinal adjustment on shaft 75 and are also adjustable lengthwise, as permitted by slots 93 and bolts 94 which also hold together a suitable split hub structure 95. A similar split hub structure 90 is provided for arm 84 which is adjustable longitudinally and rockably on shaft 75, the hub structure and adjustment being held by bolts 96. Suitable stop collars 97 fixed to the outer ends of shaft 75 maintain assembly with rack bars 77.

Toothed racks 98 are fixed on the opposed inner sides of rack bars 77, in mesh with gears 99 on a shaft 101 journaled on the frame and provided with a handwheel 102. Shafts 75 and 101 and pivots 85 and 89 all have parallel axes. When hand wheel 102 is rotated the stop fingers 74 are positioned as a group with respect to magazine discharge openings 30. Actuation of motor 87 to displace piston rod 86 to the left in FIGURE 7 rocks shaft 75 counterclockwise sufficiently to displace all of the fingers 74 out of the mouths of the chutes 31 and permit discharge of the lower row of bottles 21.

Referring now to FIGURES 3B, 5, 9 and 10, the rotary conveyor wheel 32 comprises (FIGURE 10) a circular plate 103 having a central hub 104 secured on a drive shaft 105 as by screws 100. A reversely extending cone shaped peripheral skirt 106 is formed on plate 103, and an annular conical skirt 107 projects from the plate toward magazine 29. The angle between skirts 106 and 107 is preferably about 90°.

Shaft 105 is supported in bearings 108 on a stationary frame member 109, and a longitudinal support member 111 secured to leg 83 extends forwardly to be secured to and brace member 109.

Suitably fixed upon the support structure and optionally attached to the lower end of magazine 29 at 112 is a smooth curved guide track 113 which has a generally conical surface 114 aligned with the lower end of magazine 29 and extending up to the linear conveyor 33 where it merges smooth to a straight vertical section 115 forming a side guide for bottles 21 moving along conveyor 33. An angular bracket 120 extends rigidly from support member 111 to the upper end of support upright 117, so that the parts are maintained in rigid assembly, and track 113 is preferably secured to bracket 120. Surface 114 is parallel to relatively moving skirt 107 and the space therebetween is just larger than the diameter of a bottle 21.

Plate 103 and its skirt 106 are preferably an integral sheet metal stamping. Skirt 107 may be a single annular sheet metal stamping suitably secured on plate skirt 106, but preferably it is made up of a plurality (three) of arcuate segments 116 that have their adjacent ends formed with slidable interfitting tongues 117 and grooves 118 that permit circumferential expansion of the skirt.

A plurality of radially extending brackets 119 (about twelve) are secured at their inner ends to plate 103 as by rivets 121 and their outer ends adjustably mount skirt 107 to accommodate different bottle sizes. To the inner side of skirt 107 is secured a small channel bracket 122 (FIGURE 10) in which is mounted an adjustment screw 123 that threadedly engages an aperture in an angle bracket 124 which in turn is mounted for adjustment on bracket 119 in a direction radially of the conveyor wheel, as by slot 125 and screw 126.

Thus the segments of skirt 107 may be adjusted radially outwardly, as permitted by their tongue and groove connections, and their clearance with skirt 106 adjusted by screws 123. This adapts the assembly to different bottle sizes, and since this mounting of skirt 107 is on the side opposite to that which engages the bottles it does not interfere with bottle movement along guide surface 114.

The bottles are moved along surface 114 by pusher members secured to skirt 107, as shown in FIGURES 5 and 10. Preferably there are three, disposed equally about the circumference of skirt 107. Each comprises a plate 127 suitably fixed upon skirt 107 as by studs 128 (FIGURE 10) and having at least two pins 129 projecting at right angles to skirt 107 into the space between skirt 107 and guide 113. As skirt 107 is rotated each pair of pins 129 engages the side of a bottle 21 and pushes the deposited group of bottles in front of it along surface 114. An electric motor unit 131 mounted on brace 109 is connected to rotate shaft 105.

On the outer end of each 120° spaced pusher plate 127 is mounted a micro switch control member 132 of suitable size adapted to trip and hold closed switch 133 (FIGURES 3B and 5) which as shown in FIGURE 7 is in the circuit of a solenoid 134 controlling a compressed air supply valve 135 mounted in the supply line to air cylinder motor 87. This control circuit is diagrammatically shown in FIGURE 7, the solenoid and motor parts being provided with the usual spring bias returns. Any suitable control interlock between switch 133 and the compressed air supply line to cylinder 87 which will operate, when switch 133 is tripped, to cause cylinder 87 to rock stop fingers 74 away from the magazine lower end long enough to permit discharge of a row of bottles and then return the stop fingers in time to arrest the next group of bottles 21 may be used in the invention.

It will be observed (FIGURE 1) that the switch 133 is located to be tripped by a member 132 moving toward the lower end of magazine 29. The speed of conveyor 32 and the time required for a single released row of bottles 21 to drop out of the chutes onto the guide surface 114 are so related that a group of bottles will be located as shown in FIGURE 3B ready for pushing onward by pins 129. The circumferential length of member 132 is selected for timed return of the stop fingers 74 into the paths of the next group of bottles descending the chutes.

Switch 133 is a snap switch which tends to return to open position, so that after member 132 passes the circuit is opened, the deactivated solenoid closes the air pressure supply line and the biasing spring within motor 87 quickly returns the parts to the FIGURE 3B position, line 136 between the valve and motor being vented to atmosphere at this time.

In operation an open bottom carton of empty plastic bottles is placed on the left of the platform in FIGURE 1 and pushed into the preadjusted guide rail area until belt 24 takes over and moves the carton toward the magazine. As each row of bottles overlies aperture 28 it drops into the magazine, one bottle into each chute. Where the carton holds only twelve bottles the magazine will be filled by each carton. Where the carton is more than three rows long, as indicated in FIGURE 3A, the timing of carton advance is synchronized to the rate of discharge of a group of bottles from the lower end of the magazine. The empty cartons merely drop off the right edge of platform 22.

Discharge of each group of bottles onto the conveyor means comprising guide 113 and rotary wheel 32, is timed by the location of switch 133 and the length of time the switch is held closed to permit this action. As each actuator 132 passes the switch 133 the switch recloses to return the stop fingers 74 to reblock the lower ends of the chute compartments.

The continuously moving conveyor wheel 32 pushes each group of bottles up the smooth guide surface 114 to deposit them in a row onto the continuously moving belt 33. It will be appreciated that prior to entering the filling machine the bottles on belt 33 are usually passed through a suitable spacing device to uniformly space them along the belt 33.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for handling lightweight empty containers comprising a platform along which an open bottom carton of said containers is adapted to be moved toward an aperture, a magazine opening into said platform aperture for receiving a plurality of said containers from the carton, means for periodically delivering a plurality of said containers as a group from out of the magazine to a first conveyor means, and means for sequentially transferring said group of containers in order to a second conveyor means.

2. Apparatus for handling lightweight empty containers comprising a platform along which an open bottom compartmented carton of said containers is adapted to be moved, means in the platform forming an aperture in the path of said carton and separated into sections corresponding to compartments of said carton passing in overlying relation thereto, means for vibrating said platform to insure removal of containers from the carton compartments, a stationary magazine opening into a platform aperture and having chute sections for recovering a plurality of said containers and means for periodically delivering the lowermost of said containers in said chute sections as a group to removal conveyor means.

3. In the apparatus defined in claim 2, said removal conveyor means comprising a continuous conveyor always having a portion moving past the lower ends of said chute sections, and means moving with said conveyor for actuating said periodic delivery means.

4. In the apparatus defined in claim 2, said means for periodically delivering said containers to the removal conveyor means comprising stops blocking the lower ends of said chute sections automatically moved to non-blocking position in timed relation to movement of said conveyor means.

5. Apparatus for handling lightweight empty containers comprising a platform along which an open bottom carton of said containers is adapted to be moved toward an aperture, a magazine opening into said platform aperture for receiving a plurality of said containers from the carton, and means for periodically delivering a plurality of said containers as a group from said magazine to conveyor means comprising a stationary guide surface and continuously moving means for moving said group of containers along said guide surface.

6. In the apparatus defined in claim 5, said guide surface being a smooth track extending from the lower end of said magazine upwardly to a transfer station, and a second conveyor at said transfer station adapted to receive containers from said conveyor means.

7. In the apparatus defined in claim 6, said continuously moving means comprising a continuously rotating generally circular conveyor wheel at least partially supporting said group of containers, and said guide track conforming to the path of said circular conveyor over a predetermined circumferential extent.

8. Apparatus for handling lightweight containers comprising a platform along which an open bottom carton of said containers is adapted to be moved to overlie an aperture through which the containers drop one row at a time from out of the carton, a magazine extending downwardly from said aperture and comprising a plurality of side by side chutes for said containers, stop means at the discharge ends of said chutes, a continuously moving conveyor disposed adjacent the discharge ends of said chutes, and means operated by said conveyor for actuating said stop means for periodically unblocking said discharge ends of said chutes.

9. Apparatus for handling lightweight containers comprising a platform along which an open bottom carton of said containers is adapted to be moved to overlie an aperture through which the containers drop one row at a time from out of the carton, a magazine extending downwardly from said aperture and comprising a plurality of side by side chutes for said containers, stop means at the discharge ends of said chutes, a smooth curved guideway extending away from the discharge ends of said chutes, means for actuating said stop means for periodically unblocking said discharge ends of said chutes to permit the lowermost containers to fall as a group toward said guideway, and a conveyor having a portion moving continuously past said discharge ends of said chutes for pushing said container groups along said guideway.

10. Apparatus for handling lightweight containers comprising a platform along which an open bottom carton of said containers is adapted to be moved to overlie an aperture through which the containers drop one row at a time from out of the carton, a magazine extending downwardly from said aperture and comprising a plurality of side by side chutes for said containers, stop means at the discharge ends of said chutes, means for actuating said stop means for periodically unblocking said discharge ends of said chutes, a guideway extending away from said discharge ends of said chutes adapted to receive containers from said magazine, means for pushing said containers along said guideway, and a conveyor for carrying said containers away from said guideway.

11. In the apparatus defined in claim 10, said pushing means comprising a rotary wheel shaped to extend over said guideway and carrying pusher members adapted to directly engage containers on said guideway.

12. In the apparatus defined in claim 11, said means for unblocking the discharge ends of the chutes comprising a motor having a control circuit including switching means operated by actuators on said pusher members.

13. Apparatus for handling lightweight empty containers comprising a platform along which an open bottom compartmented carton of said containers is adapted to be moved, said platform comprising an aperture and a continuously moving belt for advancing said carton to overlie said aperture, a magazine having sectional chutes corresponding to the compartments of said carton located to receive rows of containers dropping through said aperture, means at the lower ends of said chutes for arresting discharge of said containers from said chutes, a conveyor for receiving containers from said magazine, means operated by said conveyor for actuating said discharge arresting means to periodically deposit the lowermost containers in each chute upon said conveyor, and means for vibrating said platform to insure that all containers drop out of the carton into said chutes while passing over said aperture.

14. Apparatus for handling empty lightweight containers such as plastic bottles comprising a platform having a transverse aperture and means for moving an open bottom compartmented carton of said containers across the platform toward said aperture, a magazine comprising a plurality of side by side chutes extending downwardly from an open upper end at said aperture for receiving rows of containers dropping out of said carton, means for vibrating said platform, a rock shaft extending adjacent the lower end of said magazine, stops on said rock shaft adjacent the open lower ends of said chutes, a motor connected to said rock shaft, a control circuit for said motor comprising a switch, continuous conveyor means at the lower ends of said chutes, and means on said conveyor means for operating said switch periodically to actuate said motor to unblock said lower ends of the chutes in timed relation to movement of said conveyor means.

15. Conveyor means for moving lightweight plastic bottles and like containers comprising a stationary smooth guideway and a cooperating rotary conveyor wheel having a skirt extending substantially parallel to said guideway adapted to engage the sides of said containers, a base for bottoming of said containers and pusher means for engaging said containers and moving them along said guideway.

16. The conveyor means defined in claim 15 wherein said wheel rotates about an inclined axis and said guideway is continuously inclined to extend from between the lowermost to the highermost regions of said wheel in the direction of rotation of said wheel to gradually turn said containers toward upright position.

17. The conveyor means defined in claim 16 including a generally horizontal take-away conveyor at the highermost region of said wheel adapted to receive said containers in upright position.

References Cited by the Examiner

UNITED STATES PATENTS

| | | | |
|---|---|---|---|
| 1,090,855 | 3/1914 | Jagenberg | 53—160 |
| 1,576,338 | 3/1926 | Ladd | 214—311 X |
| 1,941,043 | 12/1933 | Meyer | 198—26 |
| 2,617,543 | 11/1952 | Fahey | 214—311 |
| 2,916,125 | 12/1959 | Wallberg | 198—26 X |
| 2,996,220 | 8/1961 | Stern | 198—212 X |

HUGO O. SCHULZ, *Primary Examiner.*

GERALD M. FORLENZA, *Examiner.*

A. GRANT, *Assistant Examiner.*